UNITED STATES PATENT OFFICE.

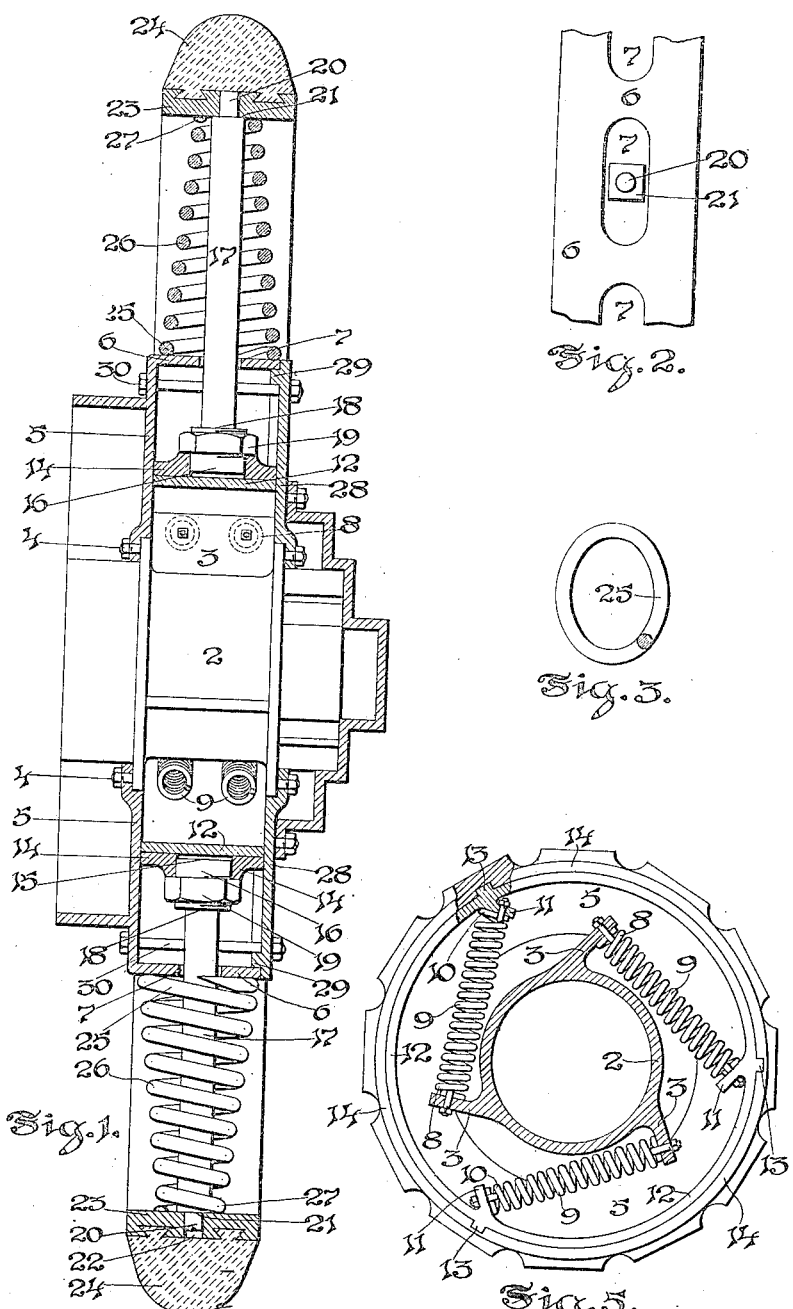

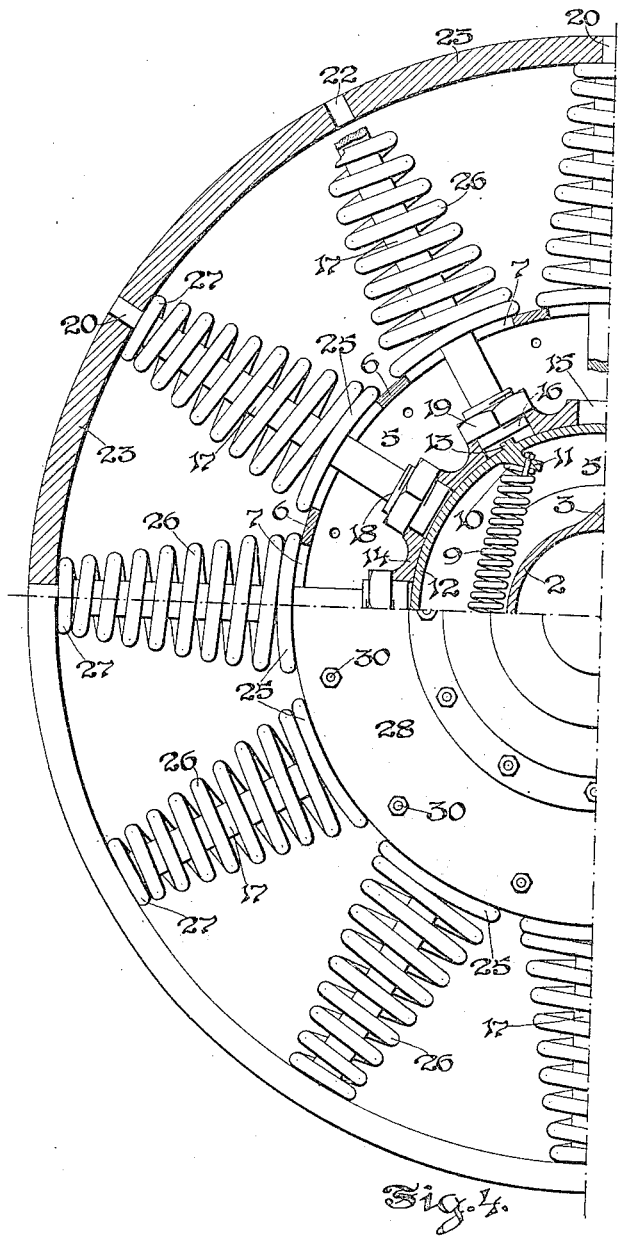

CHARLES McKINNON AND WILLIAM CHARLES BROUFF, OF OAKLANDS, NEW SOUTH WALES, AUSTRALIA, ASSIGNORS OF ONE-HALF TO PHILIP PARKER GELL, OF BURROWGONG, COROWA, AUSTRALIA, AND CLIVE McPHERSON, OF YARRAWONGA, MOIRA, AUSTRALIA.

RESILIENT WHEEL.

1,131,534.  Specification of Letters Patent.  Patented Mar. 9, 1915.

Application filed March 27, 1914. Serial No. 827,704.

*To all whom it may concern:*

Be it known that we, CHARLES McKINNON and WILLIAM CHARLES BROUFF, subjects of the King of Great Britain and Ireland, and residents of the post-town of Oaklands, in the district of Murrumbidgee, in the State of New South Wales, Commonwealth of Australia, (whose post-office address is Oaklands, in the said State of New South Wales,) have invented a certain new and useful Improved Resilient Wheel, of which the following is a specification.

This invention relates to resilient wheels particularly for use with motor vehicles and the like and has for its object to provide a simple and durable construction whereby road shocks will be effectively absorbed and if necessary the use of a pneumatic tire dispensed with. Hitherto many propositions have been suggested incorporating various arrangements of springs for the purpose mentioned, but these constructions have frequently been unreliable in use, or of a complicated nature, others have been liable to undue wear and derangement and have possessed parts which have been difficult to dismantle and replace and have usually been excessively costly to manufacture.

By this invention there is provided a wheel, consisting of but comparatively few simple parts none of which are liable to derangement and all of which are accessible for inspection or repair. The wheel has proved to be reliable in use and effectively absorbs road shocks with the use of a solid rubber tire. It is essentially useful for heavy commercial motor vehicles, such as omnibuses and the like, but it is not limited thereto. It possesses the additional advantage of considerably lessening the wear and tear upon the solid rubber tires, and upon the gearing of the vehicle.

Referring to the drawings which form a part of this specification, Figure 1 is a sectional view of a wheel according to this invention. Fig. 2 is a detail view of portion of an outer ring showing an elongated slot therein. Fig. 3 is a sectional plan of a helical spring. Fig. 4 is a view of half of a wheel. One half of the figure is seen in section. The tire is removed. Fig. 5 is a sectional view showing a hub, a first inner ring and tangential springs extending between the hub and first ring. A second inner ring to which the first ring is removably attached is also shown.

The invention includes a hub 2, protruding from the periphery of which is a series of inner lugs 3 extending laterally across the hub 2. Secured to the hub 2 by studs 4 or the like is an inner side disk 5. Integral with or secured to the periphery of the inner disk 5 is an outer flange or ring 6. Formed in the ring 6 is a series of circumferentially elongated slots 7.

Secured to the inner lugs 3 are the inner ends 8 of a series of tangential springs 9. The springs 9 may be of the helical type commonly referred to as a spiral spring. The springs 9 are preferably arranged in pairs. Three (3) pairs (more or less) are employed. The outer ends 10 of the springs 9 are secured to a series of inner lugs 11 projecting inwardly from a first inner ring 12. The inner side or edge of the ring 12 adjoins the inner side disk 5 aforementioned. The first inner ring 12 has protruding from its periphery a series of lateral keys 13 or the like. These engage in keyways or lateral grooves formed in a second inner ring 14. The first inner ring 12 is therefore removably secured within the second inner ring 14. Formed in the second inner ring 14 is a series of holes 15 corresponding in position with the elongated slots 7 of the outer ring 6.

Resting in each hole or pocket 15 is the plain inner end 16 of a radial spoke 17. The number of spokes may vary. Adjoining the inner end 16 of each spoke is a threaded portion 18 having thereon a lock nut 19. The lock nuts 19 of the spokes 17 bear against the second inner ring 14. The spokes 17 pass through the elongated slots 7 before mentioned, each spoke being provided at its outer end with a reduced extremity 20. A step or shoulder 21 is formed at the inner end of the reduced extremity 20. The reduced extremity 20 of each radial spoke 17 reposes in a hole or pocket 22 formed in a rim 23. The step or shoulder 21 bears against the rim 23. Secured to the outer surface of the rim 23 is a suitable solid rubber or other tire 24.

Bearing against the outer ring 6 are the inner ends 25 of a series of helical springs 26. The inner ends are enlarged. The outer ends 27 of the helical springs 26 bear against the rim 23 before mentioned. Each spring 26 encircles a spoke 17 and is disposed between the outer ring 6 and the rim 23. In elevation the springs 26 approximate a cone and in plan they are oval.

Extending across the outer side of the outer ring 6 is an outer side disk 28. This is provided with an annular protuberance 29 near its periphery and may be retained by bolts 30 passing through the said disk 28 and the inner disk 5 before mentioned, the bolts 30 being disposed between the spokes 17. The protuberance 29 is disposed or projects into the outer ring 6. The outer side or edge of each of the inner rings 12 and 14 adjoins the outer side disk 28.

With this invention upon a vehicle commencing its travel the driving axle, for example, communicates motion through the tangential springs 9 and the first inner ring 12 to the second inner ring 14. The inner rings thereby rotate with the axle. The spokes 17 being secured at their inner ends to the second inner ring 14 also rotate and drive the rim 25 to which they are secured. Upon a shock or road inequality being encountered the lower portion of the rim 23 moves upwardly toward the axle compressing the relative helical springs 26 between the said rim 23 and the outer ring 6. The rim is capable of such movement, by which it temporarily becomes eccentric to the hub 2 and outer ring 6, by reason of the slots 7 in the said outer ring 6. When rotating, the tire 24 being in contact with the road surface causes the rim 23 to lag until the spokes 17 encounter the ends of the slots 7 in the outer ring 6. By reason of the tangential springs 9 the movement of the spokes 17 in the slots 7 is gradual.

In practice it has been found that when employing a solid rubber tire with the arrangement described the comfort is as great, if not greater than that received when using an ordinary wheel equipped with a pneumatic tire. Further, the wheel is of a simple nature the tangential springs 9 being renewed, if desired, by removal of the outer disk 28. They are then immediately exposed. The spokes 17 may be removed by slackening back the lock nuts 19. The nuts of the bolts 30 extending between the inner and outer side disks 5 and 28 are removed as also are the nuts of the studs 4 retaining the inner side disk 5 to the hub 2. The outer disk 28, hub 2 and first inner ring 12 may then be withdrawn from the wheel and the spokes 17 removed through the holes 15 in the second inner ring 14. To renew a helical spring 26 a similar procedure is followed for when a spoke 17 is removed the helical spring 26 may obviously be at once withdrawn from between the outer ring 6 and the rim 23 without difficulty.

When reversing a vehicle the tangential springs 9 are not affected as the spokes 17 are disposed at the ends of the slots 7 in the outer ring 6 (which is secured to the hub) and therefore a solid drive is provided. It will be readily understood that the tangential springs 9, lugs 3 and first inner ring 12 may be dispensed with in wheels which are not drivers i. e. the front wheels of an ordinary commercial motor vehicle.

Having now described our invention what we claim as new and desire to secure by Letters Patent is:—

1. An improved resilient wheel, consisting in the combination with a hub, of an inner disk detachably secured to said hub, an outer ring around the hub and carried by said disk, said ring having a series of circumferentially elongated slots therein, an inner ring around said hub and disposed between the same and the outer ring, said inner ring having a series of holes formed therein, a rim around the outer ring, said rim having a series of holes formed therein, a tire carried by said rim, a series of spokes extending between the inner ring and the rim and passing through the slots, a reduced extremity at the outer end of each spoke, said reduced extremities being accommodated in the holes of the rim, a nut threaded upon the inner end of each spoke and bearing against the inner ring, the inner extremities of the spokes being accommodated in the holes of the inner ring, a helical spring encircling each spoke between the rim and the outer ring, and an outer disk extending between the outer ring and the hub.

2. An improved resilient wheel, consisting in the combination with a hub having studs protruding therefrom of an inner side disk secured to said studs, an outer ring encircling the hub and carried by said disk, said ring having a series of circumferentially elongated slots therein, an inner ring around the hub between the same and the outer ring, a series of holes formed in the inner ring, a series of spokes passing through the slots, the inner ends of said spokes being accommodated in the holes of the inner ring, a nut threaded upon the inner end of each spoke and bearing against the inner ring, a reduced extremity at the outer end of each spoke, a rim encircling the outer ends of the spokes, said rim having a series of holes therein into which the reduced spoke extremities pass, a tire secured to said rim, a helical spring encircling each spoke and bearing at its inner end against the outer ring and at its outer end against the rim, each spring being conical in elevation and oval in plan, an outer side disk detachably secured to the hub and extending to the outer ring, an annular protuberance projecting from said disk into said outer ring, and bolts passing through the inner and outer side disks.

3. In an improved resilient wheel, the combination with a hub having a series of lugs projecting therefrom, of a ring encircling said hub, said ring having a series of lateral keyways therein, a removable ring having a series of lateral keys projecting therefrom, said ring being disposed within the ring first mentioned with the keys engaging in the keyways, lugs projecting inwardly from the removable ring, and a series of pairs of tangential springs extending between and secured to the lugs of the hub and the lugs of the removable ring.

4. An improved resilient wheel, consisting of the combination with a hub of a first inner ring encircling said hub, a driving connection between and secured to the hub and said ring, a second inner ring around the first inner ring which latter is removable from within the second ring, said second inner ring having a series of holes formed therein, an outer ring encircling the second inner ring and attached to the hub, said outer ring having a series of slots formed therein, a rim around the outer ring, said rim having a series of holes formed therein, a series of spokes extending between the second inner ring and the rim and passing through the slots, the inner ends of the spokes being accommodated in the holes of the inner ring and the outer ends of the spokes being accommodated in the holes of the rim, a nut threaded upon the inner end of each spoke and bearing against the inner ring, and a helical spring encircling each spoke, each said spring bearing against the rim at its outer end and against the outer ring at its inner end.

5. An improved resilient wheel, consisting in the combination with a hub of a first inner ring encircling said hub, keys protruding outwardly from said ring, a second inner ring encircling the first inner ring, said second inner ring having keyways therein to accommodate said keys, a driving connection between and secured to the first inner ring and the hub, said second inner ring having a series of holes therein, an inner disk detachably secured to said hub, an outer ring around the hub and carried by said disk, said ring having a series of circumferentially elongated slots therein, a rim around the outer ring, said rim having a series of holes formed therein, a tire carried by said rim, a series of spokes extending between the second inner ring and the rim and passing through the slots, a reduced extremity at the outer end of each spoke, said reduced extremities being accommodated in the holes of the rim, a nut threaded upon the inner end of each spoke and bearing against the second inner ring, the inner extremities of the spokes being accommodated in the holes of the second inner ring, a helical spring encircling each spoke between the rim and the outer ring, and an outer disk extending between the outer ring and the hub.

6. An improved resilient wheel, consisting of the combination with a hub, of a first inner ring encircling said hub, a driving connection between the hub and the first inner ring, a series of lateral keys protruding outwardly from said first inner ring, a second inner ring encircling the first inner ring, said second inner ring having keyways therein to accommodate said keys, said second inner ring having a series of holes therein, studs protruding from aforesaid hub, an inner side disk secured to said studs, an outer ring encircling the hub and carried by said disk, said ring having a series of circumferentially elongated slots therein, a series of spokes passing through the slots, the inner ends of said spokes being accommodated in the holes of the second inner ring, a nut threaded upon the inner end of each spoke and bearing against the second inner ring, a reduced extremity at the outer end of each spoke, a rim encircling the outer ends of the spokes, said rim having a series of holes therein into which the reduced spoke extremities pass, a tire secured to said rim, a helical spring encircling each spoke and bearing at its inner end against the outer ring and at its outer end against the rim, each spring being conical in elevation and oval in plan, an outer side disk detachably secured to the hub and extending to the outer ring, an annular protuberance projecting from said disk into said outer ring, and bolts passing through the inner and outer side disk.

In testimony whereof we have hereunto affixed our signatures in the presence of two subscribing witnesses.

CHARLES McKINNON.
WILLIAM CHARLES BROUFF.

Witnesses:
JOSHUA ADDISON HARGRAVE,
JOHN JOSEPH MULLINS.

Copies of this patent may be obtained for five cents each, by addressing the "Commissioner of Patents, Washington, D. C."